(12) United States Patent
Sol et al.

(10) Patent No.: US 6,870,134 B2
(45) Date of Patent: Mar. 22, 2005

(54) HEATABLE VEHICLE WINDSHIELD WITH BUS BARS INCLUDING BRAIDED AND PRINTED PORTIONS

(75) Inventors: Jean-Marc Sol, Thionville (FR); Christian Bizzari, Hayange (FR)

(73) Assignee: Centre Luxembourgeois de Recherches pour le Verre et la Ceramique S.A. (C.R.V.C.) (LU)

(*) Notice: Subject to any disclaimer, the term of this patent is extended or adjusted under 35 U.S.C. 154(b) by 300 days.

(21) Appl. No.: 10/060,281

(22) Filed: Feb. 1, 2002

(65) Prior Publication Data

US 2003/0146199 A1 Aug. 7, 2003

(51) Int. Cl.[7] .............................. B60L 1/02; H05B 1/00
(52) U.S. Cl. ........................................ 219/203; 219/219
(58) Field of Search ................................. 219/203, 200, 219/202, 212, 219, 522, 523, 201; 244/121, 134; 296/84.1, 77.1, 79; 29/811.612

(56) References Cited

U.S. PATENT DOCUMENTS

| | | | |
|---|---|---|---|
| 3,781,524 A | * 12/1973 | Levin | .......................... 219/522 |
| 3,893,234 A | 7/1975 | Levin | |
| 4,078,107 A | 3/1978 | Bitterice et al. | |
| 4,137,447 A | 1/1979 | Boaz | |
| 4,246,467 A | 1/1981 | Boaz | |
| 4,361,751 A | 11/1982 | Criss et al. | |
| 4,388,522 A | 6/1983 | Boaz | |
| 4,543,466 A | 9/1985 | Ramus | |
| 4,593,175 A | 6/1986 | Bowser et al. | |
| 4,618,088 A | 10/1986 | Karla | |
| 4,703,328 A | 10/1987 | Jones et al. | |
| 4,755,659 A | * 7/1988 | Leon et al. | ................... 219/547 |
| 4,785,988 A | 11/1988 | Topel et al. | |
| 4,820,902 A | 4/1989 | Gillery | |
| 4,874,930 A | * 10/1989 | Voss et al. | ................... 219/522 |
| 5,023,403 A | * 6/1991 | Eckardt et al. | ............ 174/94 R |
| 5,099,104 A | 3/1992 | Holzer et al. | |
| 5,408,069 A | * 4/1995 | Mischel, Jr. | ................ 219/219 |
| 5,506,057 A | 4/1996 | Olson | |
| 5,716,536 A | * 2/1998 | Yokoto et al. | ............... 219/219 |
| 5,738,554 A | 4/1998 | Borger et al. | |
| 6,042,932 A | 3/2000 | Ingles et al. | |
| 6,185,812 B1 | * 2/2001 | Castle et al. | ................... 29/611 |
| 6,204,480 B1 | 3/2001 | Woodard et al. | |
| 6,444,293 B1 | 9/2002 | Gregory et al. | |
| 6,625,875 B2 | * 9/2003 | Sol | ............................. 29/621 |

FOREIGN PATENT DOCUMENTS

EP     1 168 888     1/2002

* cited by examiner

*Primary Examiner*—Daniel Robinson
(74) *Attorney, Agent, or Firm*—Nixon & Vanderhye P.C.

(57) ABSTRACT

A heatable window (e.g., vehicle windshield) includes a heatable layer including one or more conductive layers. The heatable layer may be a single layer conductive coating, or alternatively may be a multi-layer heatable coating including one or more dielectric layer(s) in addition to one or more heatable conductive layer(s). Bus bars are provided so that a voltage may be applied across at least one conductive layer of the coating, in order to heat the layer so that the coating generates heat for defogging, deicing and/or desnowing the window. At least a portion of one of the bus bars includes both an underlying conductive base layer portion, and an overlying conductive braid portion that is conductively attached to the conductive base portion. The braid portion significantly increases the current capacity of the bus bar portion if so desired.

21 Claims, 8 Drawing Sheets

HEATABLE VEHICLE WINDSHIELD WITH BUS BARS INCLUDING BRAIDED AND PRINTED PORTIONS

This invention relates to a heatable vehicle window (e.g., heatable vehicle windshield or any other type of heatable vehicle window). More particularly, this invention relates to a heatable vehicle window including at least one bus bar, wherein the bus bar includes both a printed portion (e.g., silk-screen silver (Ag) inclusive portion) and a braided portion provided over and in electrical communication with the printed portion.

BACKGROUND OF THE INVENTION

Heatable vehicle windows are known in the art, and typically include top and bottom conductive bus bars in electrical contact with a transparent conductive coating including an electro conductive layer. The electro conductive layer generates heat when electric current is passed therethrough via the bus bars. In such a manner, snow and ice may be melted from vehicle windows such as windshields, backlites, and/or the like. Windows may also be defogged in such a manner. Moreover, since terminal connections (e.g., via jumper wires) for both bus bars are typically provided at the bottom of the window, this means that bus bar portions have to be provided along a side(s) of the window in order to supply electric current to/from the top bus bar.

U.S. Pat. No. 4,820,902 illustrates that conventional heatable vehicle windows utilize both a top bus bar and a bottom bus bar, wherein side leads of the top bus bar extend upwardly along both the right and left sides of the window in areas where the conductive coating has been deleted. This is sometimes undesirable, as the presence of bus bar portions at both sides of the window can reduce the viewing area of the window and/or reduce the area of the heatable conductive coating since the coating has to be deleted from areas where these side bus bar portions are provided.

In order to overcome the problem(s) relating to U.S. Pat. No. 4,820,902 discussed above, a bus bar may be provided along only one side of the heatable window leading to the top bus bar portion (e.g., see U.S. Pat. No. 3,893,234). However, such an arrangement of the '234 patent is problematic in that in certain situations only a limited amount of current can be carried by the side bus bar portion (i.e., it would be desirable for the side bus bar portion to carry more current to/from the top bus bar portion than the '234 side bus bar portion enables). The result of the '234 structure is that the heatable conductive coating cannot be efficiently heated. This problem becomes even more pronounced with larger vehicle windows to be heated.

It can be seen from the above that there exists a need in the art for a heatable vehicle window which includes a bus bar portion for communicating with the top bus bar portion, which extends up only one side of the vehicle window. In such a window, there exists a need in the art for a bus bar portion design capable of additional current capacity so that a large amount of current can be carried to/from the top bus bar portion along only one side of the window.

U.S. Pat. No. 6,042,932 discloses a braided bus bar which is directly electrically connected to an underlying heatable coating via contact pad(s). Unfortunately, because the braided bus bar is directly connected to the heatable coating, hot spots tend to be generated periodically at different points in the coating where the bus bar is electrically connected thereto. It can be seen that it is not desirable for a braided bus bar to be directly electrically connected to an underlying heatable coating. Moreover, the '932 utilizes braided bus bars on both sides of the window, thereby failing to address and/or recognize the problem(s) discussed above.

U.S. Pat. No. 4,703,328 discloses a heatable vehicle rear window including bus bars provided along both sides thereof for supplying current to an array of cross heating elements. Each bus bar includes a conductive frit strip underlying a single strand copper wire lead that is soldered thereto. Because the '328 patent uses bus bars on both sides of the window, it fails to address of remedy the problems in the art discussed above. Moreover, single strand copper wires are typically not capable of carrying enough current to remedy the problems with the '234 patent discussed above.

In view of the above, it will be appreciated by those skilled in the art that there exists a need for a heatable vehicle window which more efficiently supplies current to a heatable conductive coating thereof. In particular, there exists a need for a bus bar portion design that is capable of supplying an adequate amount of electric current to/from a top bus bar when the bus bar portion is provided along only one of two sides of the heatable window.

BRIEF SUMMARY OF EXAMPLE EMBODIMENTS OF THE INVENTION

An object of this invention is to provide a heatable vehicle window including bus bar portion(s) which efficiently supplying electric current to/from a continuous heatable coating.

Another object of this invention is to provide a bus bar portion for supplying electric current to/from a heatable coating, wherein the bus bar portion includes both (a) an underlying conductive base portion, and (b) an overlying conductive braid portion that is conductively attached to the conductive base portion along a length portion of the bus bar portion. In this respect, the braid portion significantly increases the current capacity of the bus bar portion so that if desired, such a bus bar portion for supplying current to/from a top bus bar portion need only be provided along one of the two sides of the window assuming that the terminal connections are at the bottom of the window.

Another object of this invention is to fulfill one or more of the aforesaid objects and/or needs.

Certain example embodiments of this invention fulfill one or more of the above listed objects and/or needs by providing a heatable vehicle windshield comprising: first and second substrates laminated together via at least one interlayer, the interlayer comprising a polymer; a coating supported by one of the substrates, the coating including at least one heatable conductive layer; first and second bus bars in electrical communication with the at least one heatable conductive layer of the coating so that when electric current is passed through the at least one conductive layer of the coating via the bus bars the at least one conductive layer generates heat in order to heat at least a portion of the vehicle windshield; the first bus bar including a conductive base layer and an elongated conductive braid, wherein a first portion of the conductive base layer of the first bus bar is provided on the first substrate in an area where the coating is not present so as to be electrically insulated from the coating, and a second portion of the conductive base layer of the first bus bar is provided on the first substrate over and in contact with a portion of the coating; wherein, on at least part of the first portion of the conductive base layer where the conductive base layer is spaced from and electrically insulated from the coating, the conductive braid is provided over and in electrical communication with the conductive base layer along at least part of a length of the braid; and wherein at least part of the conductive base layer is provided electrically between the conductive braid and the coating so that current flowing between the braid and coating flows through the conductive base layer.

Other example embodiments of this invention fulfill one or more of the above listed objects and/or needs by providing a heatable window comprising: first and second spaced apart substrates coupled to one another, one of the substrates supporting a coating that includes at least one heatable conductive layer; first and second bus bars in electrical communication with the coating, so that when voltage is applied across the coating heat is generated; and wherein at least one of the bus bars comprises: (a) a conductive base layer that is provided over and in contact with a portion of the coating, and (b) a conductive braid that is provided over and in electrical contact with the conductive base layer along at least a portion of a length of the conductive base layer.

DETAILED DESCRIPTION OF EXAMPLE EMBODIMENTS OF THE INVENTION

Figure 1:
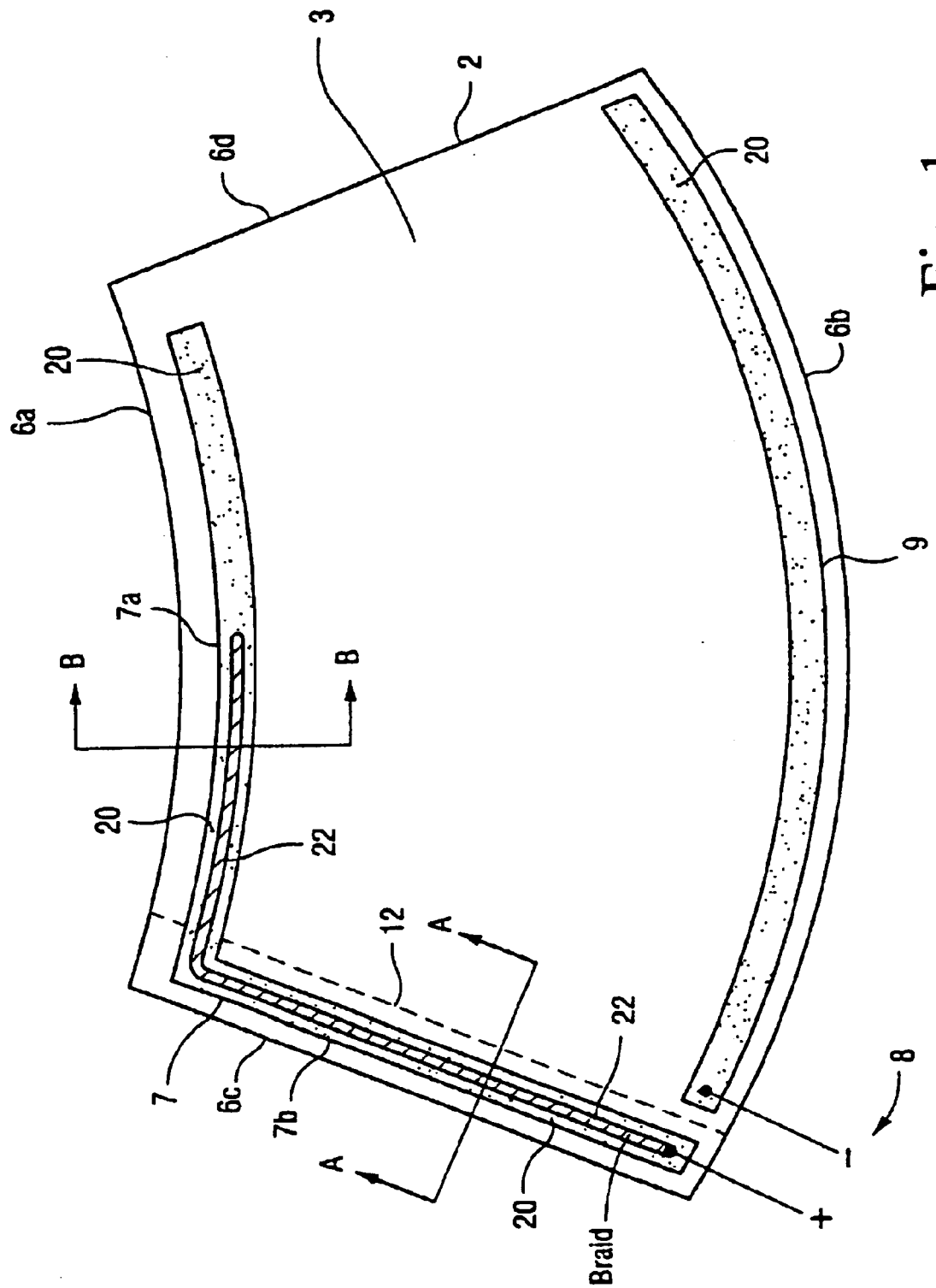
FIG. 1 is a top plan view of a substrate supporting a conductive coating and bus bar arrangement thereon, according to an example embodiment of this invention (this figures illustrates a vehicle windshield except for the second substrate and polymer interlayer which are to be provided over the FIG. 1 structure).

Referring now more particularly to the accompanying drawings in which like reference numerals indicate like parts throughout the several views.

This invention relates to a heatable window (e.g., heatable vehicle windshield, heatable vehicle backlite, heatable architectural window, etc.) including bus bar portion(s) capable of carrying a significant amount of current to/from a conductive heatable coating so that the coating and thus the window can be heated. In certain example embodiments of this invention, the heatable window includes both a top bus bar portion provided along a top side of the window and a bottom bus bar portion provided along a bottom side of the window. A bus bar portion for supplying electric current to one or both of the top and bottom bus bar portions includes both (a) an underlying conductive printed portion (e.g., of or including Ag), and (b) an overlying conductive braided portion that is conductively attached to the conductive printed portion along a length portion (full or partial length portion) thereof. The braided portion significantly increases the current capacity of the bus bar portion so that if desired, such a bus bar portion for supplying current to/from the top and/or bottom bus bar portion need only be provided along one of the two sides of the window assuming that the terminal connections are at the top or bottom of the window.

Referring to FIGS. 1–4, a heatable vehicle window (e.g., vehicle windshield) according to an example non-limiting embodiment of this invention includes heatable coating 3 sandwiched between first and second glass substrates 2 and 4, respectively. Heatable coating 3 may comprise only a single conductive substantially transparent (i.e., at least 70% transparent to visible light, more preferably at least 80% transparent to visible light) layer (e.g., comprising ITO, Ag, or the like); or alternatively heatable coating 3 may comprise a multi-layered coating including at least one substantially transparent conductive heatable layer therein. For example, see the multi-layered heatable coatings disclosed in U.S. Ser. Nos. 09/816,667 and/or 09/946,955, each of which is hereby incorporated herein by reference (each of these heatable coatings includes a plurality of dielectric layers and at least one conductive heatable layer of a material such as silver or Ag). Coating 3 may thus be a multi-layered low-E type coating in certain example embodiments. Other suitable heatable coatings may also be used. In certain example embodiments of this invention, heatable coating 3 is continuous in nature across a viewing area of the window (i.e., there are no holes or voids in the coating 3 in the viewing area (or central area) of the window). Coating 3 is preferably provided on the interior surface of one of the substrates, so that the coating 3$i$ is on what is known conventionally as the window's #2 or #3 surface.

In certain example embodiments of this invention, coating 3 is at least 70% transmissive of visible light (Ill. A, 2 deg. Observer), more preferably at least 75% transmissive of visible light. In certain example embodiments, coating 3 has a sheet resistance ($R_s$) less than or equal to 8 ohms/square, more preferably less than or equal to 5 ohms/square. In certain example embodiments, coating 3 has a normal emissivity of less than or equal to 0.15, more preferably less than or equal to 0.10, and most preferably less than or equal to 0.06.

Figure 3:
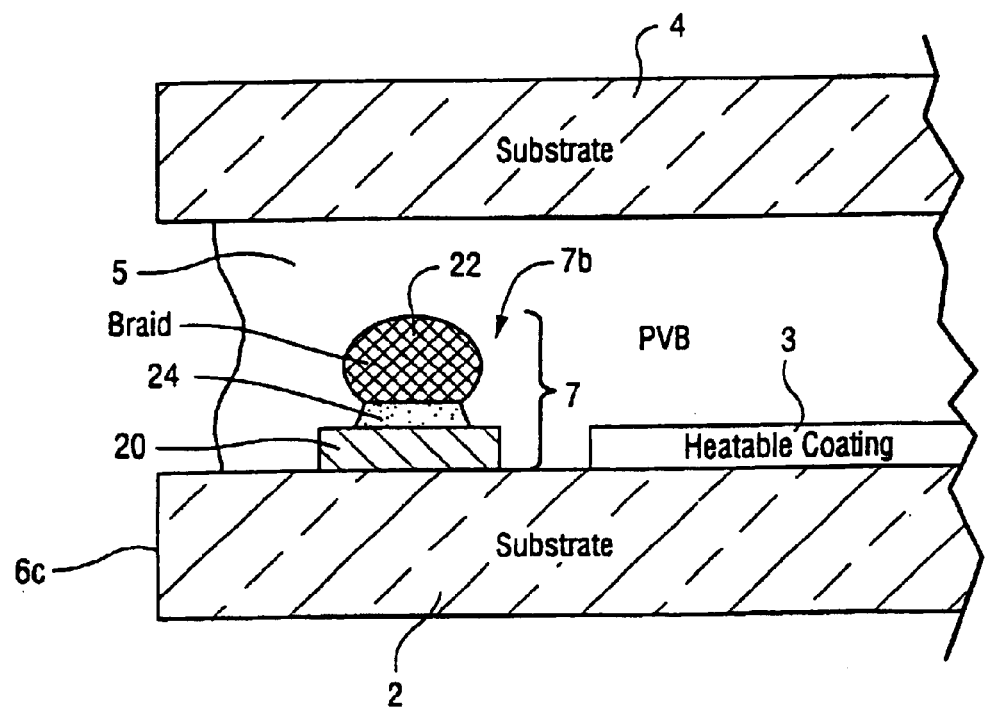
FIG. 3 is a cross section view of the FIG. 2 structure, after the FIGS. 1–2 structure has been laminated to another substrate via a polymer inclusive interlayer so as to form a laminated vehicle windshield.

A polymer inclusive interlayer 5 is provided between the substrates for conventional lamination purposes (e.g., see FIG. 3). Polymer inclusive interlayer 5 may include, for example and without limitation, polyvinyl butyral (PVB), or any other suitable lamination material.

Still referring to FIGS. 1–4, first and second elongated bus bars 7 and 9 are provided between the substrates 2, 4 so as to be in electrical contact with at least one electro conductive layer of the beatable coating 3. Bus bar 9 is considered a bottom bus bar since it is provided at a bottom portion of the window, while bus bar 7 is considered a top bus bar since it is at least partially provided at a top portion of the window. Bus bar 7 includes both a top portion 7a and an extension portion 7b provided along a side of the window. When electric current is passed through the electro conductive layer(s) of coating 3 via bus bars 7 and 9 (using electrical connectors/leads/terminals 8), heat is generated by the coating 3 (i.e., heat is generated by one of more layers of the coating 3) in order to defog, defrost and/or melt ice or snow from the window. Electrical connection terminals 8 supply power to the coating 3 via the bus bars 7, 9 from an external power source. An example external power source may be a DC battery of a vehicle, and is represented by "+" and "−" in the figures.

The windshield of FIGS. 1–4 includes top edge 6a, bottom edge 6b, left side 6c and right side 6d. Bottom bus bar 9 is provided adjacent (i.e., within about 12 inches of) the bottom edge 6b of the window, while the top portion 7a of bus bar 7 is provided adjacent (i.e., within about 12 inches of) the top edge 6a of the window and extension or side portion 7b of bus bar 7 is provided adjacent (i.e., within about 12 inches of) one of the side edges (6c or 6d) of the window. Extension or side portion 7b of bus bar 7 extends from top portion 7a of bus bar 7 downwardly along a side of the window so that both electrical connectors/terminals 8 can be located at one area or one side of the window.

Portions of coating 3 originally deposited on substrate 2 are deleted proximate at least the side (6c and/or 6d) of the window where portion 7b of bus bar 7 is located, so that portion 7b of the bus bar is not provided over and in contact with the coating 3. In particular, see deletion line 12 (dotted line) which illustrates the outer edge of coating 3 after deletion. This enables extension or side portion 7b of bus bar 7 to be electrically insulated from coating 3 along the side of the window (although top portion 7a of the bus bar is in electrical contact with the coating 3 at the top of the window). As shown in FIG. 1, in certain example embodiments of this invention, at least part of top bus bar portion 7a is approximately parallel (i.e., parallel plus/minus 10 degrees) to top edge 6a of the window, side bus bar portion 7b is approximately parallel to the adjacent side 6c or 6d of the window, and at least part of bottom bus bar 9 is approximately parallel to the bottom edge 6b of the window.

Figure 2:
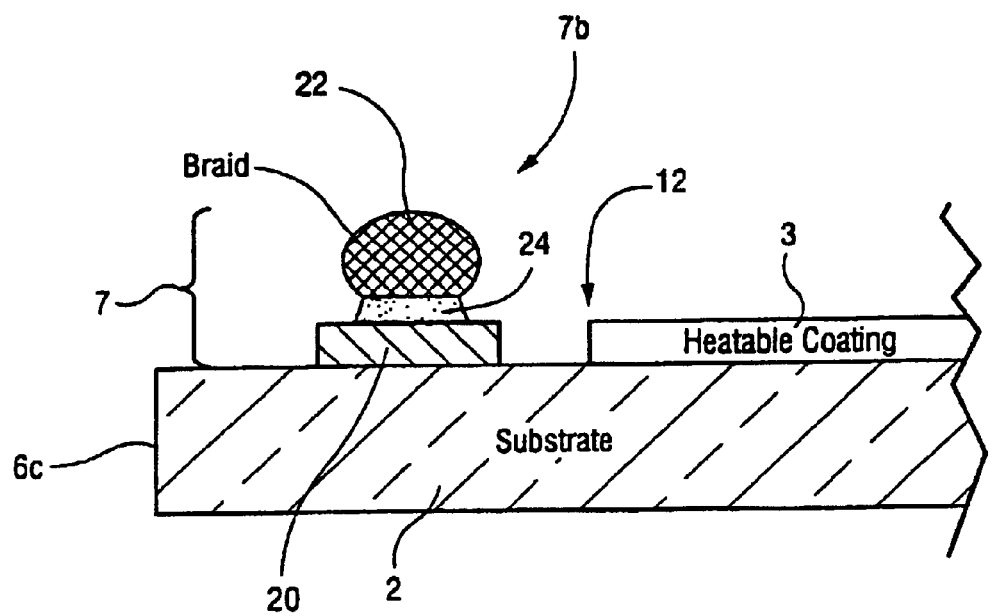
FIG. 2 is a cross sectional view taken along section line A—A of the FIG. 1 structure.

Referring in particular to FIGS. 2–3, at least part of side bus bar portion 7b includes both conductive base layer 20 and overlying conductive braid 22 electrically connected thereto. Conductive base layer 20 may comprise, for example, Ag, Ag inclusive frit, or some other material silk-screened (i.e., printed) onto underlying substrate 2. Conductive base layer 20 may be from about 2–20 $\mu$m thick in certain example embodiments, more preferably from about 5–15 $\mu$m thick, and most preferably about 10 $\mu$m thick. Thus, base layer 20 is typically significantly thicker than coating 3. Conductive braid 22 may be of or include, for purposes of example and without limitation, braided copper (Cu) wire optionally with a Sn coating. Other suitable conductive braided wires may also suffice. Braid 22 is preferably adhered to conductive base layer 20 via conductive solder 24 or some other conductive material such as conductive adhesive. The provision of braid 22, in addition to conductive base layer 20, in making up the bus bar portion 7b enables the bus bar portion 7b to carry more current to and/or from the top bus bar portion 7a thereby resulting in the coating 3 being heated in a more efficient manner. This also enables bus bar portion 7b to only be need along one of the two sides 6c, 6d of the window (i.e., the side bus bar portion 7b is provided along or adjacent only one of the two window sides) which is an advantage over certain prior art discussed above.

Figure 4:
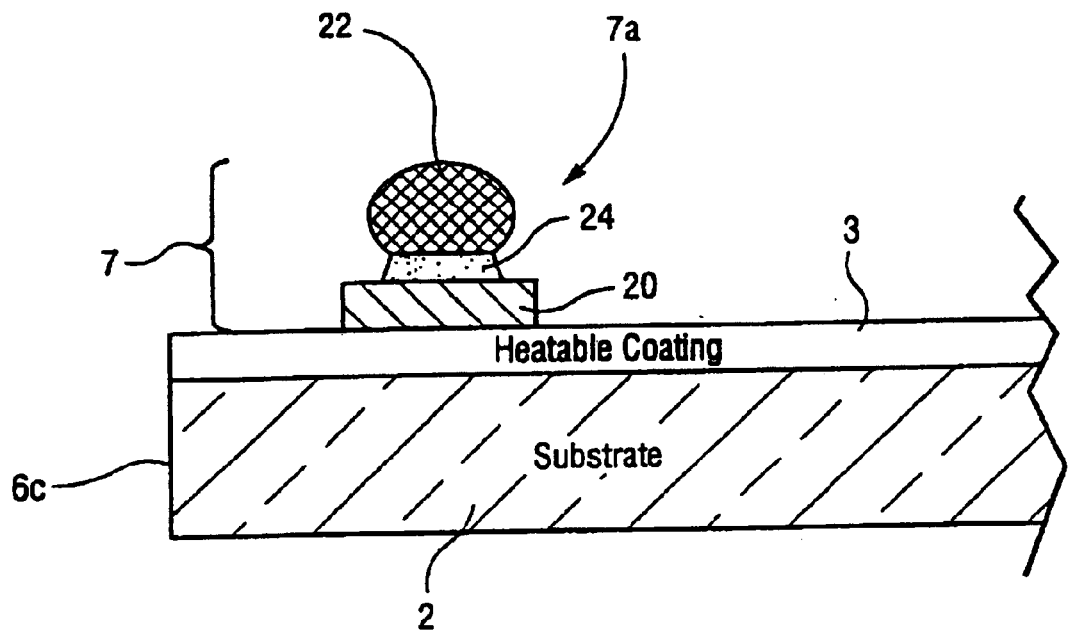
FIG. 4 is a cross sectional view taken along section line B—B of the FIG. 1 structure.

Neither conductive base layer 20 nor braid 22 is provided over the heatable coating 3 along the side of the window at bus bar side portion 7b. This is because coating 3 has been deleted 12 from the side portion of the window where bus bar portion 7a is located (see FIGS. 1–3). However, as shown in FIGS. 1 and 4, at the top of the window, the bus bar 7 passes over top of the deletion line 12 so that top bus bar portion 7a is electrically connected to the heatable coating via conductive base layer 20. In other words, all current flowing to/from the coating 3 via the top bus bar portion 7a passes through conductive base layer 20. Advantageously, the provision of conductive base layer 20 electrically (and optionally structurally) between the braid 22 and the coating 3 enables the potential for hot spots between the bus bar 7 and coating 3 to be reduced since the electrical connection between coating 3 and conductive base layer 20 along a top portion of the coating 3 is continuous over a predetermined length of at least 70% of the windshield top width.

The FIGS. 1–4 embodiment illustrates that braid 22 is provided on the entire length of side bus bar portion 7b as well as a portion of top bus bar portion 7a. However, the instant invention is not so limited. In other embodiments, a braid may also be provided on bottom bus bar 9. Alternatively, braid 22 may be provided only on side bus bar portion 7b (along the entire length thereof, or along only a portion thereof), and not on top bus bar portion 7a. In still further alternative embodiments, braid 22 may be provided on all bus bar portions of the window.

Figure 5:
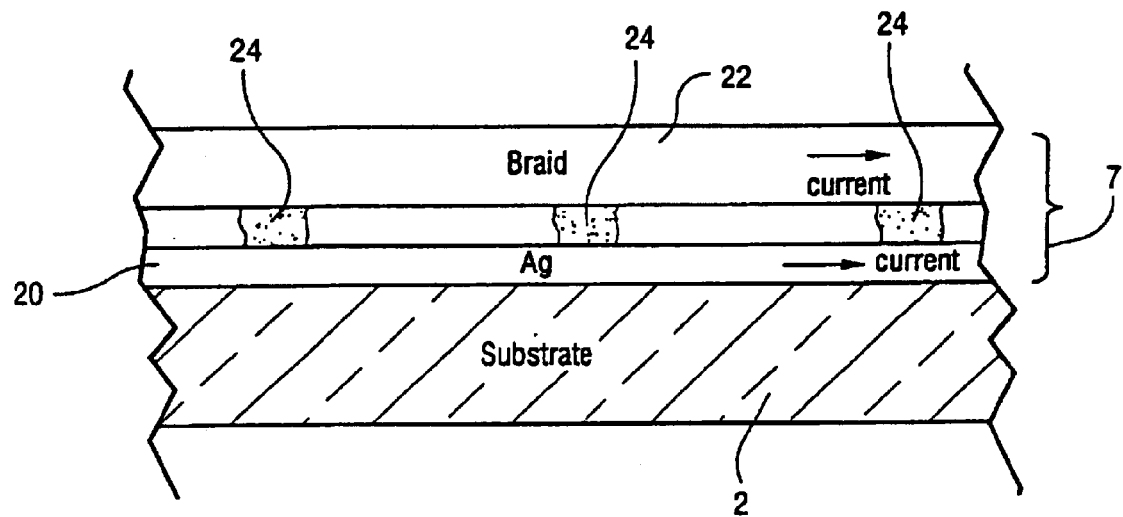
FIG. 5 is a cross sectional view of a portion of the FIG. 1 structure, taken along a short section line (not shown) that is transverse of orthogonal to and intersects section line A—A; so as to cross sectional show a portion of a bus bar portion along a length portion thereof according to an example embodiment of this invention.
Figure 6:
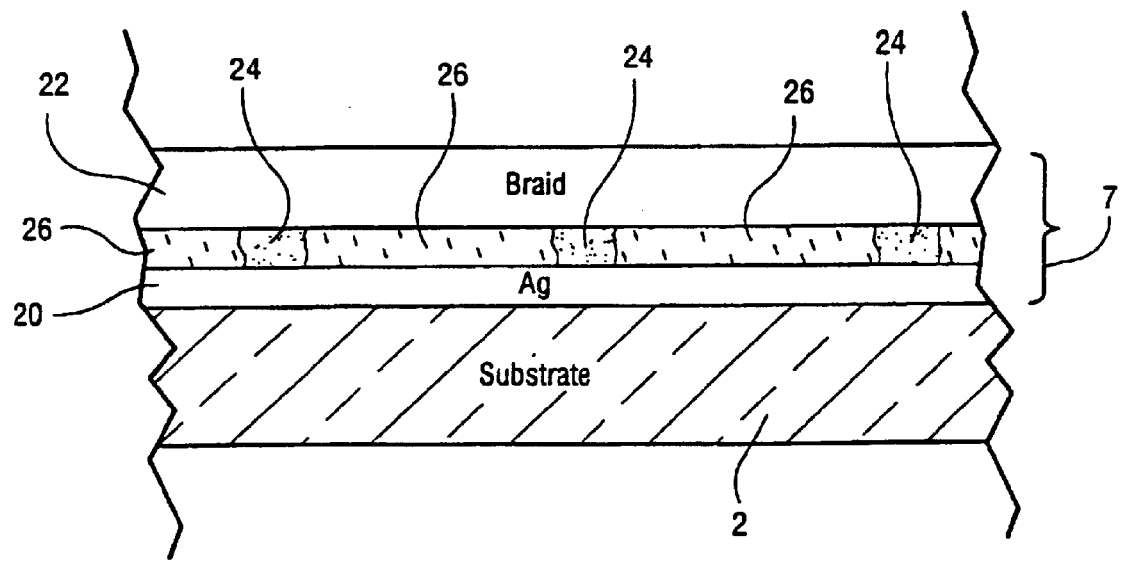
FIG. 6 is a cross sectional view of a portion of the FIG. 1 structure, taken along a short section line (not shown) that is transverse of orthogonal to and intersects section line A—A; so as to cross sectional show a portion of a bus bar portion along a length portion thereof according to another example embodiment of this invention.

Referring to FIGS. 5 and 6, braid 22 may be electrically connected to conductive base layer 20 in different manners in different embodiments of this invention. For example and without limitation, braid 22 may be electrically connected to base layer 20 via a plurality of spaced apart solder joints 24 in certain embodiments (e.g., see FIG. 5). Optionally, the spaces between adjacent solder joints 24 may be filled in with conductive adhesive 26 so that braid 22 is electrically connected to conductive base layer 20 in a continuous manner (e.g., see FIG. 6). In still other embodiments, braid 22 may be electrically connected to base layer 20 only via some electrically conductive adhesive.

Referring to FIGS. 1–5, an example method of making a heatable laminated vehicle windshield according to an example non-limiting embodiment of this invention will now be described. The materials described and illustrated are for purposes of example only and are not intended to be limiting. Initially, float glass (e.g., soda-lime-silica glass) substrate 2 is provided at a thickness of from about 1.0 to 10.0 mm, more preferably from about 1.6 to 4.0 mm thick.

A low-E coating 3 having at least one electro conductive heatable layer (e.g., of or including Ag or ITO) is deposited thereon via sputtering or some other suitable technique (e.g., see the coatings in Ser. Nos. 09/816,667 and 09/946,955, although clearly other types of heatable coatings may instead be used). In certain example embodiments, coating 3 may have a plurality of dielectric layers (e.g., silicon nitride, zinc oxide, and/or tin oxide) and at least one electro conductive layer (e.g., Ag or ITO). The coated substrate may then be thermally tempered. A portion of coating 3 is then deleted from the substrate such as along side 6c of the substrate (see coating deletion line 12).

Bus bar conductive base layer(s) 20 (e.g., Ag or Ag inclusive frit) is then silk screen deposited/printed (other deposition techniques may be used in other embodiments) onto the substrate 2. Base layer(s) 20 is deposited on substrate 2 so that all of bus bar 9 is deposited on and over coating 3 so that the coating 3 is located between the substrate 2 and the conductive layer 20. However, the conductive base layer 20 for bus bar 7 is deposited on substrate 2 so that in the area for top bus bar portion 7a the conductive base layer 20 is deposited on and over coating 3 so that the coating 3 is located between the substrate 2 and the conductive layer 20 in the area of the top bus bar portion 7a; but in the area for side bus bar portion 7b the conductive base layer 20 is deposited on the substrate in an area where coating 3 has been deleted (see deletion line 12). When the coating 3 is simply a one-layer coating of Ag, ITO or some other conductive material, then the conductive base layer 20 is electrically connected thereto upon deposition of layer 20 directly onto the coating in the areas of the lower bus bar 9 and top bus bar portion 7a. However, when the coating 3 is a multi-layer coating including one or more dielectric layers in addition to a conductive layer(s), then the base layer 20 as deposited may not be in electrical contact with the conductive layer(s) of the coating; in such instances the conductive layer 20 may be electrically connected to conductive layers in the coating 3 by heating as discussed in Ser. No. 09/816,667 (i.e., heating causes the base layer 20 to bleed through dielectric layer(s) of the coating 3 so that it contacts electro conductive layer(s) of the coating 3).

Conductive braid 22 is then provided on the desired portion of bus bar 7 and/or 9 and electrically adhered thereto via conductive solder 24 and/or conductive adhesive. Connectors 8 may be attached to the bus bars at this point in the process, or at a later point during window manufacture. This results in the structure of FIG. 1. The FIG. 1 structure is then heat bent (if desired) and then laminated to another substrate 4 via polymer inclusive interlayer 5 thereby resulting in a heatable vehicle windshield. When voltage is applied across the conductive layer(s) of coating 3 via bus bars 7, 9, the coating generates heat in order to defog, deice and/or desnow the windshield.

Figure 7:
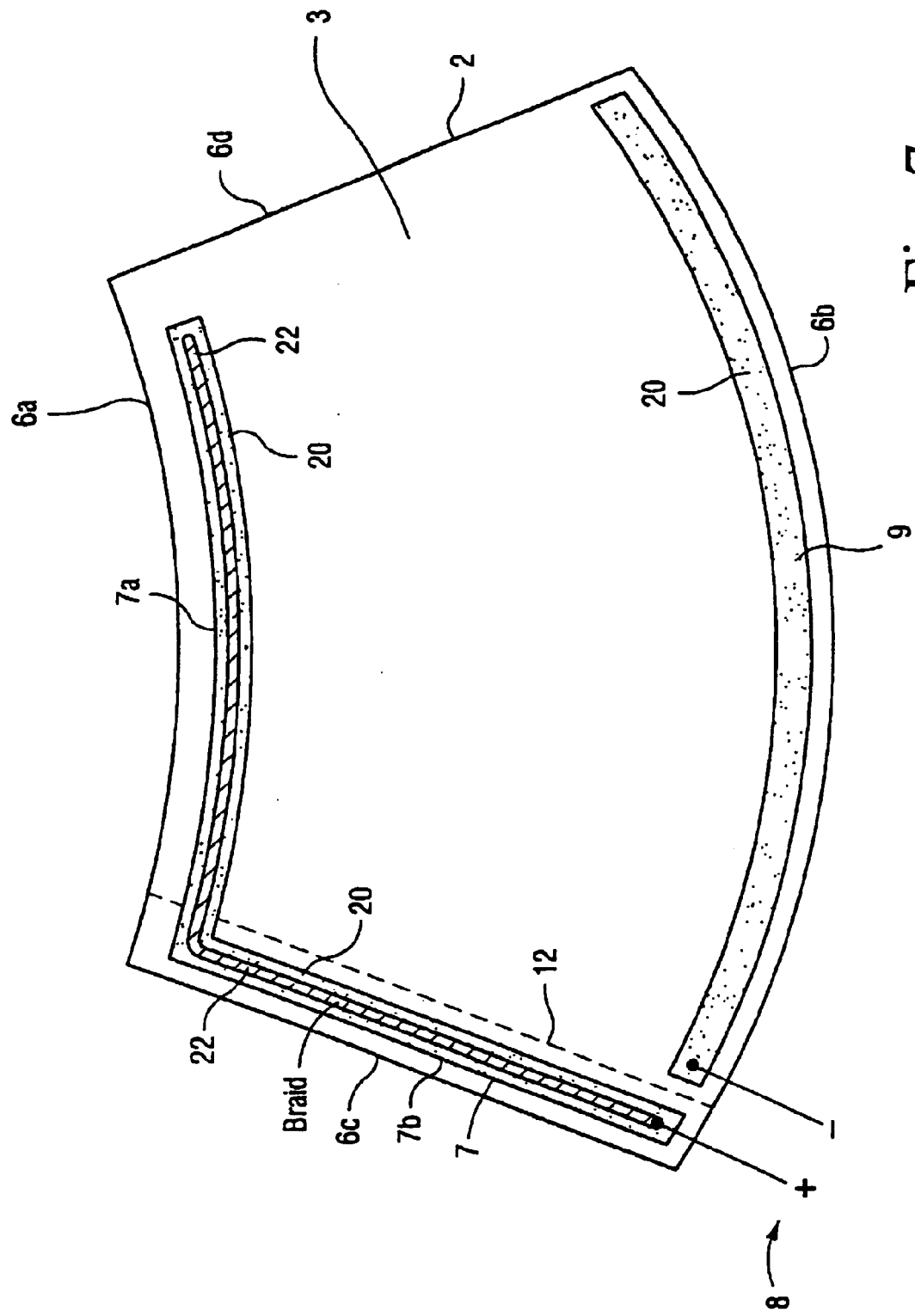
FIG. 7 is a top plan view of a substrate supporting a conductive coating and bus bar arrangement thereon, according to another example embodiment of this invention (this figures illustrates a vehicle windshield except for the second substrate and polymer interlayer which are to be provided over the FIG. 7 structure).
Figure 8:
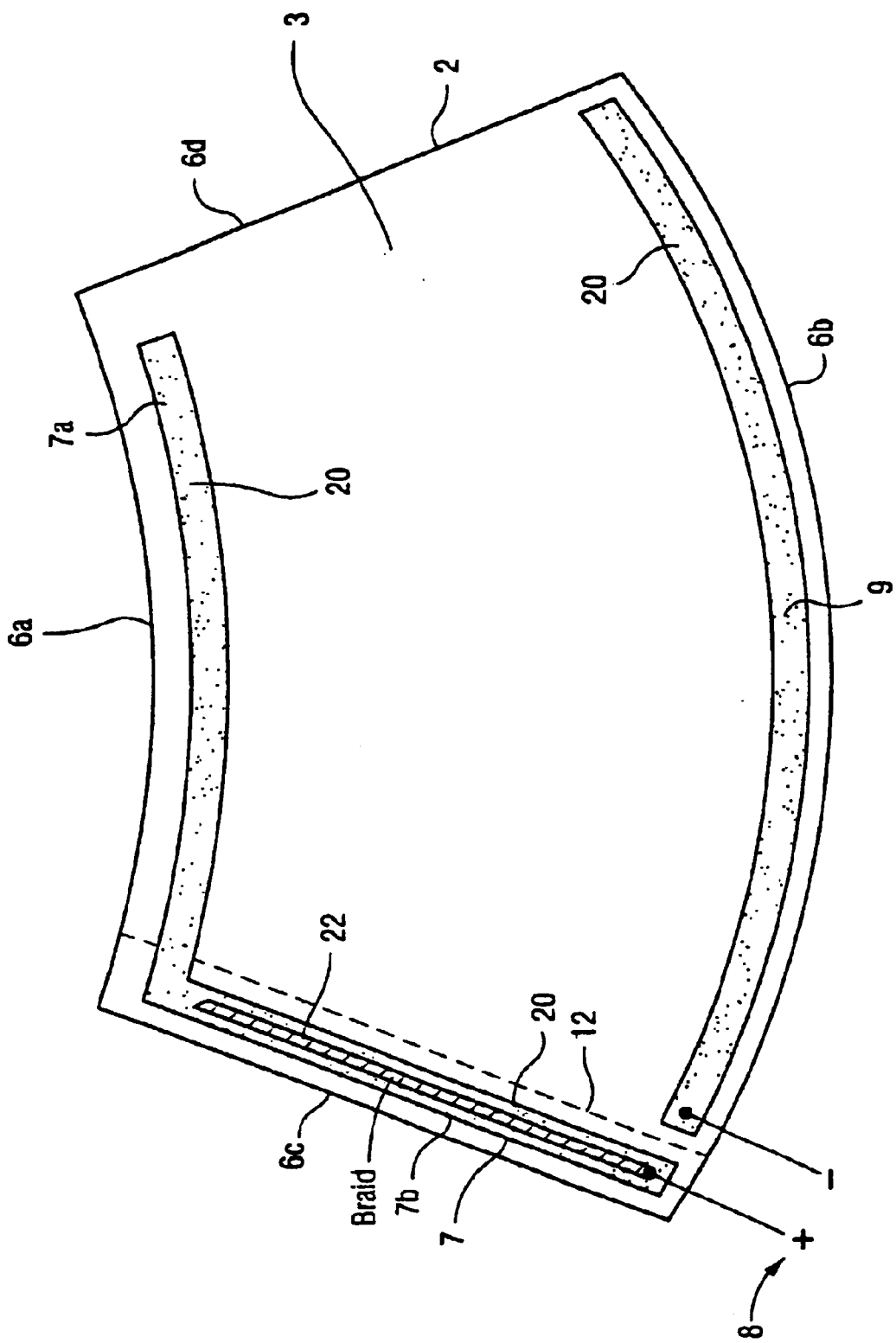
FIG. 8 is a top plan view of a substrate supporting a conductive coating and bus bar arrangement thereon, according to yet another example embodiment of this invention (this figures illustrates a vehicle windshield except for the second substrate and polymer interlayer which are to be provided over the FIG. 8 structure).

FIGS. 7–8 illustrate other embodiments of this invention. In the FIG. 7 embodiment, the braid 22 is provided over the base conductive layer 20 along substantially the entire length of bus bar 7 (it optionally may be provided on bus bar 9 in certain instances). In the FIG. 8 embodiment, conductive braid 22 is provided only along substantially the entire length of side bus bar portion 7b, but not along most of the length of top bus bar portion 7a. In still further non-illustrated embodiments of this invention, bus bar portions 7b including both braid 22 and underlying conductive base layer 20 may be provided along both of the opposing sides of the window. In still further non-illustrated embodiments of this invention, the top and bottom bus bars 7 and 9, respectively, may be shifted so as to be opposing side bus bars, in which case the bus bar portions 9 and 7a would be provided along and adjacent sides of the windshield while bus bar portion 7b would be provided along either the top of bottom edge of the windshield.

It is noted that the braid may be of any suitable size in different embodiments of this invention. For example and without limitation, the braid may have a width of from about 4–20 mm, more preferably about 10 mm, in certain example embodiments of this invention.

Figure 10:
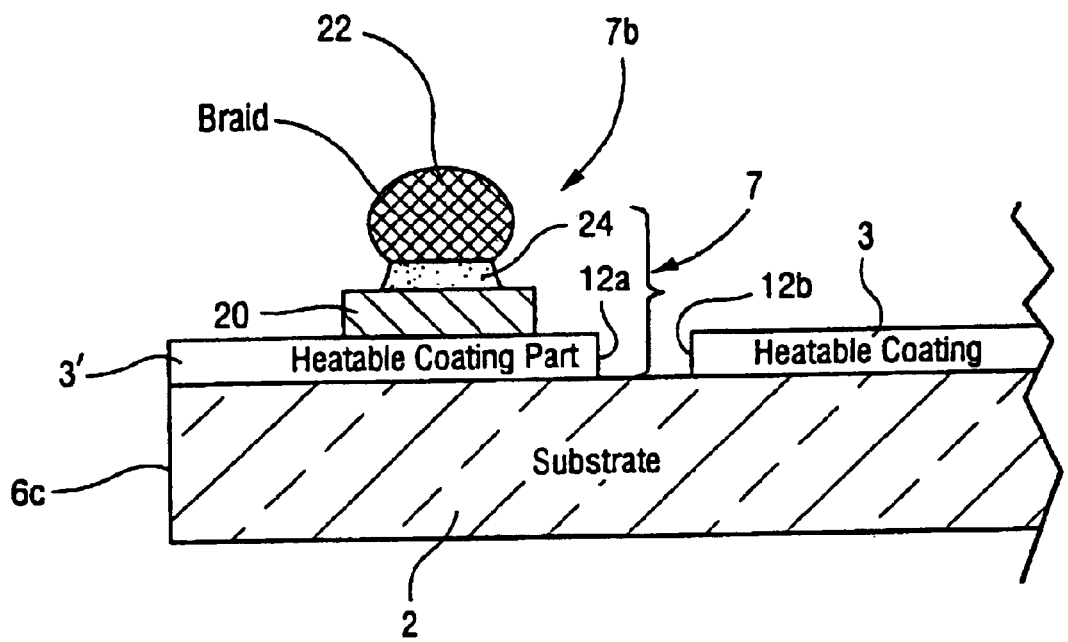
FIG. 10 is a cross sectional view taken along section line A'—A' of the FIG. 9 structure.
Figure 9:
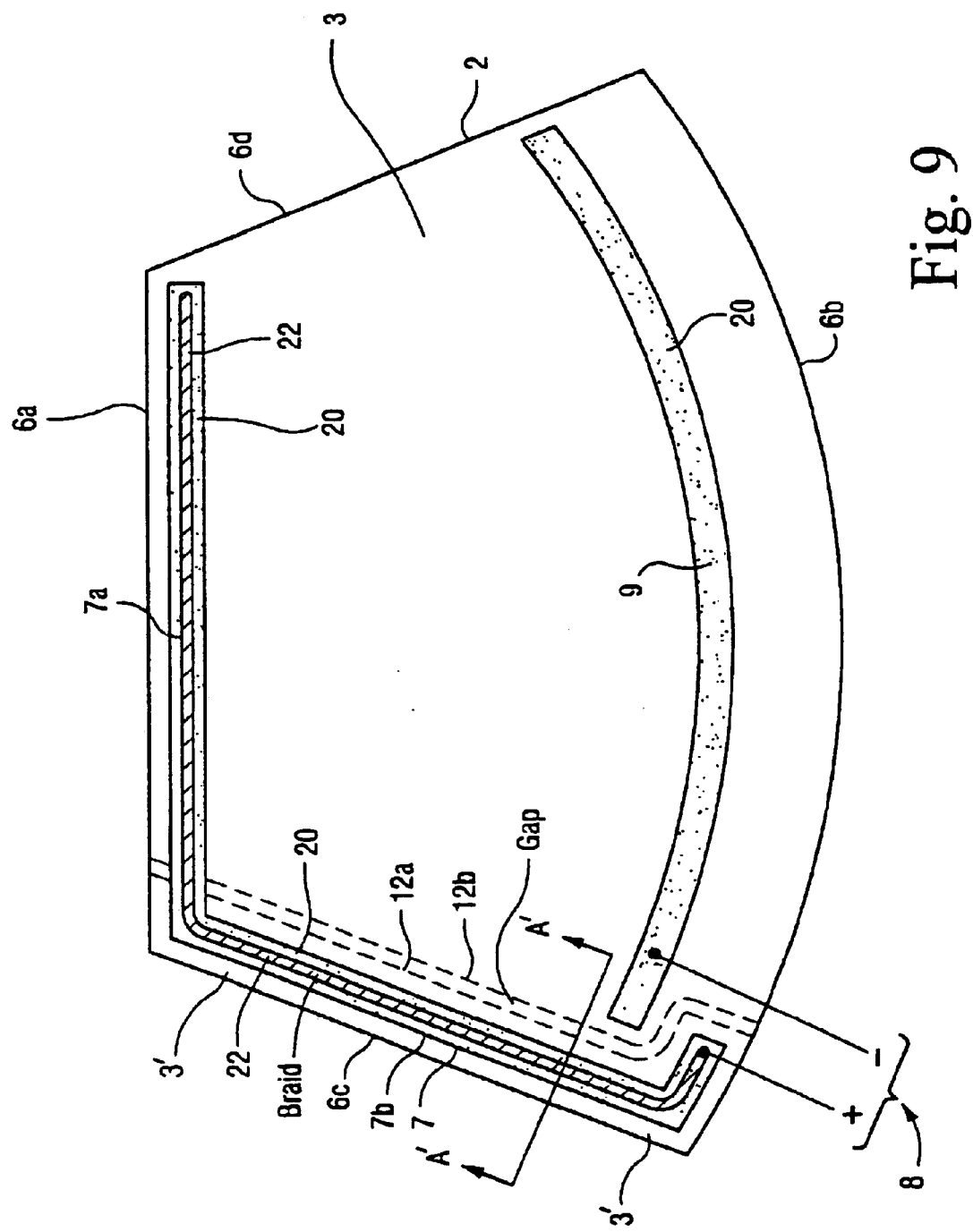
FIG. 9 is a top plan view of a substrate supporting a conductive coating and bus bar arrangement thereon, according to another example embodiment of this invention (this figures illustrates a vehicle windshield except for the second substrate and polymer interlayer which are to be provided over the FIG. 9 structure).

FIGS. 9–10 illustrate another embodiment of this invention. The FIGS. 9–10 embodiment is similar to the FIGS. 1–8 embodiments, except that a portion 3' of conductive coating 3 makes up part of bus bar portion 7b. In particular, coating 3 is originally deposited on the entire substrate 2, and then a narrow channel or strip area thereof is deleted as illustrated by deletion lines 12a and 12b shown in FIGS. 9–10. This results in an insulating gap being defined between heatable portion 3 of the coating and bus bar portion 3' of the coating. The insulating gap between coating 3, 3' deletion lines 12a and 12b may be, for example, from about 0.1 to 5 mm thick/wide. It can be seen that bus bar portion 3' is not in direct contact with heatable portion 3 of the coating. Thus, at least part of side bus bar portion 7b includes conductive coating portion 3', conductive base layer 20 and overlying conductive braid 22 electrically connected thereto. The provision of braid 22, in addition to conductive base layer 20 and conductive coating portion 3', in making up the bus bar portion 7b enables the bus bar portion 7b to carry more current to and/or from the top bus bar portion 7a thereby resulting in the coating 3 being heated in a more efficient manner. This also enables bus bar portion 7b to only be need along one of the two sides 6c, 6d of the window (i.e., the side bus bar portion 7b is provided along or adjacent only one of the two window sides) which is an advantage over certain prior art discussed above.

Figure 11:
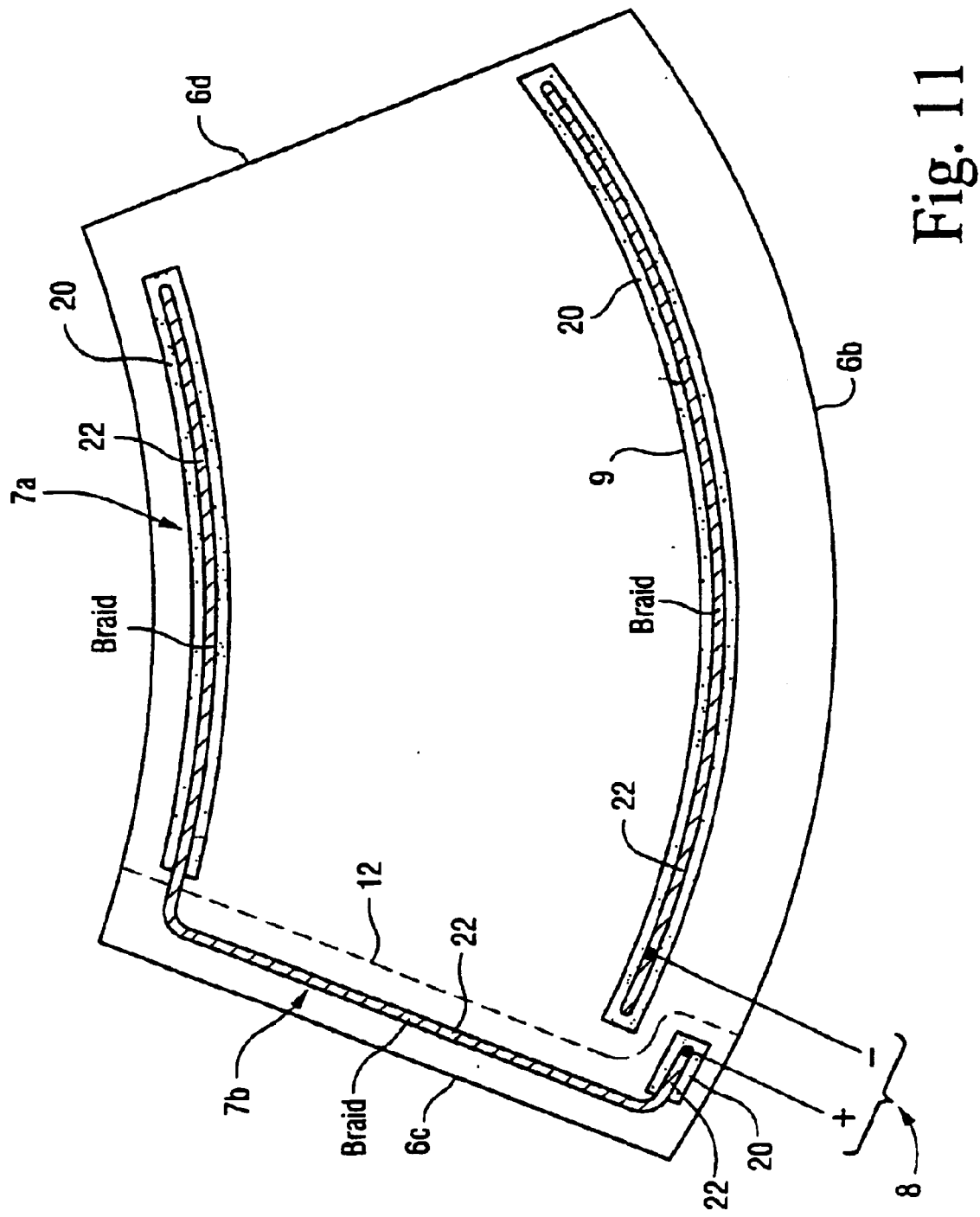
FIG. 11 is a top plan view of a substrate supporting a conductive coating and bus bar arrangement thereon, according to another example embodiment of this invention (this figures illustrates a vehicle windshield except for the second substrate and polymer interlayer which are to be provided over the FIG. 11 structure).

FIG. 11 illustrates another example embodiment of this invention. The FIG. 11 embodiment is similar to the FIGS. 1–8 embodiments, except that: (a) the bottom bus bar 9 includes both conductive base layer 20 and conductive braid 22 thereon, (b) bus bar 7 includes a top portion 7a that includes both conductive base layer 20 and braid 22 thereon but the base layer 20 is discontinued during the length of the bus bar 7 so that side bus bar portion 7b of the bus bar 7 has a substantial length portion thereof that includes braid 22 but not base layer 20. Base layer 20 then may be provided at a terminal portion of the bus bar 7 proximate the bottom of the windshield as shown in FIG. 11.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heatable vehicle windshield comprising:

first and second substrates laminated together via at least one interlayer, the interlayer comprising a polymer;

a coating supported by one of the substrates, the coating including at least one heatable conductive layer;

first and second bus bars in electrical communication with the at least one heatable conductive layer of the coating so that when electric current is passed through the at least one conductive layer of the coating via the bus bars the at least one conductive layer generates heat in order to heat at least a portion of the vehicle windshield;

the first bus bar including a conductive base layer and an elongated conductive braid, wherein a first portion of the conductive base layer of the first bus bar is provided on the first substrate in an area where the coating is not present so as to be electrically insulated from the coating, and a second portion of the conductive base layer of the first bus bar is provided on the first substrate over and in contact with a portion of the coating;

wherein, on at least part of the first portion of the conductive base layer where the conductive base layer is spaced from and electrically insulated from the coating, the conductive braid is provided over and in electrical communication with the conductive base layer along at least part of a length of the braid;

wherein at least part of the conductive base layer is provided electrically between the conductive braid and the coating so that current flowing between the braid and coating flows through the conductive base layer; and wherein the coating is continuously provided across a central viewing area of the windshield, so that there are no holes or gaps in the coating in the central viewing area of the windshield.

2. The heatable vehicle windshield of claim 1, wherein the first portion of the conductive base layer of the first bus bar is provided adjacent only one side of the vehicle windshield.

3. The heatable vehicle windshield of claim 1, wherein the conductive base layer comprises silver (Ag).

4. The heatable vehicle windshield of claim 1, wherein the braid comprises braided Cu inclusive wire.

5. The heatable vehicle windshield of claim 1, wherein the first portion of the conductive base layer of the first bus bar is provided adjacent only one side of the windshield and not along the entire length of either the top or bottom of the windshield, and the second portion of the conductive base layer of the first bus bar is provided adjacent a top edge of the vehicle windshield.

6. The heatable vehicle windshield of claim 1, wherein the braid is electrically connected to the conductive base layer via at least conductive solder at a plurality of spaced apart locations.

7. The heatable vehicle windshield of claim 1, wherein the braid is provided on and electrically connected to the conductive base layer on at least portions of both the first and second portions of the conductive base layer.

8. The heatable vehicle windshield of claim 1, wherein the polymer of the interlayer comprises polyvinyl butyral (PVB).

9. A heatable vehicle windshield comprising:
first and second substrates laminated together via at least one interlayer, the interlayer comprising a polymer
a coating supported by one of the substrates, the coating including at least one heatable conductive layer;
first and second bus bars in electrical communication with the at least one heatable conductive layer of the coating so that when electric current is passed through the at least one conductive layer of the coating via the bus bars the at least one conductive layer generates heat in order to heat at least a portion of the vehicle windshield;
the first bus bar including a conductive base layer and an elongated conductive braid, wherein a first portion of the conductive base layer of the first bus bar is provided on the first substrate in an area where the coating is not present so as to be electrically insulated from the coating, and a second portion of the conductive base layer of the first bus bar is provided on the first substrate over and in contact with a portion of the coating;

wherein, on at least part of the first portion of the conductive base layer where the conductive base layer is spaced from and electrically insulated from the coating, the conductive braid is provided over and in electrical communication with the conductive base layer along at least part of a length of the braid;

wherein at least part of the conductive base layer is provided electrically between the conductive braid and the coating so that current flowing between the braid and coating flows through the conductive base layer;

wherein the braid is electrically connected to the conductive base layer via at least conductive solder at a plurality of spaced apart locations; and wherein conductive adhesive is provided between the braid and the conductive base layer at locations between the spaced apart locations where the solder is present, so as to form a continuous electrical connection between the braid and the conductive base layer along a length of the braid.

10. A heatable window comprising:
first and second spaced apart substrates coupled to one another, one of the substrates supporting a coating that includes at least one heatable conductive layer;
first and second bus bars in electrical communication with the coating, so that when voltage is applied across the coating heat is generated; and
wherein at least one of the bus bars comprises: (a) a conductive base layer that is provided over and in contact with a portion of the coating, and (b) a conductive braid that is provided over and in electrical contact with the conductive base layer along at least a portion of a length of the conductive base layer.

11. The heatable window of claim 10, wherein the braid is in electrical contact with the conductive base layer via at least a plurality of spaced apart solder connections.

12. The heatable window of claim 11, wherein conductive adhesive is provided between at least first and second ones of the spaced apart solder connections.

13. The heatable window of claim 10, wherein the window is a vehicle windshield.

14. The heatable window of claim 10, wherein the coating comprises a plurality of dielectric layers, and first and second heatable conductive layers that are in electrical communication with the bus bars.

15. The heatable window of claim 10, wherein the braid is provided along only one of two opposing sides of the window.

16. The heatable window of claim 10, wherein at least a portion of the braid is provided on the substrate over the base layer at an area where the coating is not provided.

17. A heatable window comprising:
first and second spaced apart substrates coupled to one another, one of the substrates supporting a coating having a portion thereof deleted or removed so that the coating is divided into first and second portions that are spaced apart from one another;
wherein at least the first portion of the coating includes at least one heatable conductive layer;
first and second bus bars in electrical communication with at least the first portion of the coating, so that when voltage is applied across the first portion of the coating heat is generated;

wherein at least one of the bus bars comprises: (a) at least part of the second portion of the coating, (b) a conductive layer that is provided over at least a portion of the second portion of the coating, and (c) a conductive braid that is provided over at least a portion of the conductive layer; and wherein the coating includes a plurality of dielectric layers, and first and second layers comprising Ag.

18. The heatable window of claim 17, wherein the conductive layer comprises Ag.

19. A heatable vehicle windshield comprising:

first and second substrates laminated together via at least one interlayer;

a coating supported by one of the substrates, the coating including at least one heatable conductive layer;

first and second bus bars in electrical communication with the at least one heatable conductive layer of the coating so that when electric current is passed through the at least one conductive layer of the coating via the bus bars the at least one conductive layer generates heat in order to heat at least a portion of the vehicle windshield;

the first bus bar including a conductive base layer and an elongated conductive strip, wherein a first portion of the conductive base layer of the first bus bar is provided on the first substrate in an area where the coating is not present so as to be electrically insulated from the coating, and a second portion of the conductive base layer of the first bus bar is provided on the first substrate over and in contact with a portion of the coating;

wherein, on at least part of the first portion of the conductive base layer where the conductive base layer is spaced from and electrically insulated from the coating, the conductive strip is provided over and in electrical communication with the conductive base layer along at least part of a length of the conductive strip;

wherein at least part of the conductive base layer is provided electrically between the conductive strip and the coating so that current flowing between the strip and coating flows through the conductive base layer; and wherein the coating is continuously provided across a central viewing area of the windshield, so that there are no holes or gaps in the coating in the central viewing area of the windshield.

20. A heatable window comprising:

first and second spaced apart substrates coupled to one another, one of the substrates supporting a coating having a portion thereof deleted or removed so that the coating is divided into first and second portions that are spaced apart from one another;

wherein at least the first portion of the coating includes at least one heatable conductive layer;

first and second bus bars in electrical communication with at least the first portion of the coating, so that when voltage is applied across the first portion of the coating heat is generated;

wherein at least one of the bus bars comprises: (a) at least part of the second portion of the coating, (b) a conductive layer that is provided over at least a portion of the second portion of the coating, and (c) a conductive strip that is provided over at least a portion of the conductive layer; and wherein the coating is continuously provided across a central viewing area of the windshield, so that there are no holes or gaps in the coating in the central viewing area of the windshield.

21. The heatable window of claim 10, wherein the coating is continuously provided across a central viewing area of the windshield, so that there are no holes or gaps in the coating in the central viewing area of the windshield.

* * * * *